June 11, 1968  J. O. FISHER, SR., ET AL  3,387,722
APPARATUS FOR PARKING VEHICLES IN VERTICALLY ARRANGED PAIRS
Filed May 3, 1967  4 Sheets-Sheet 1
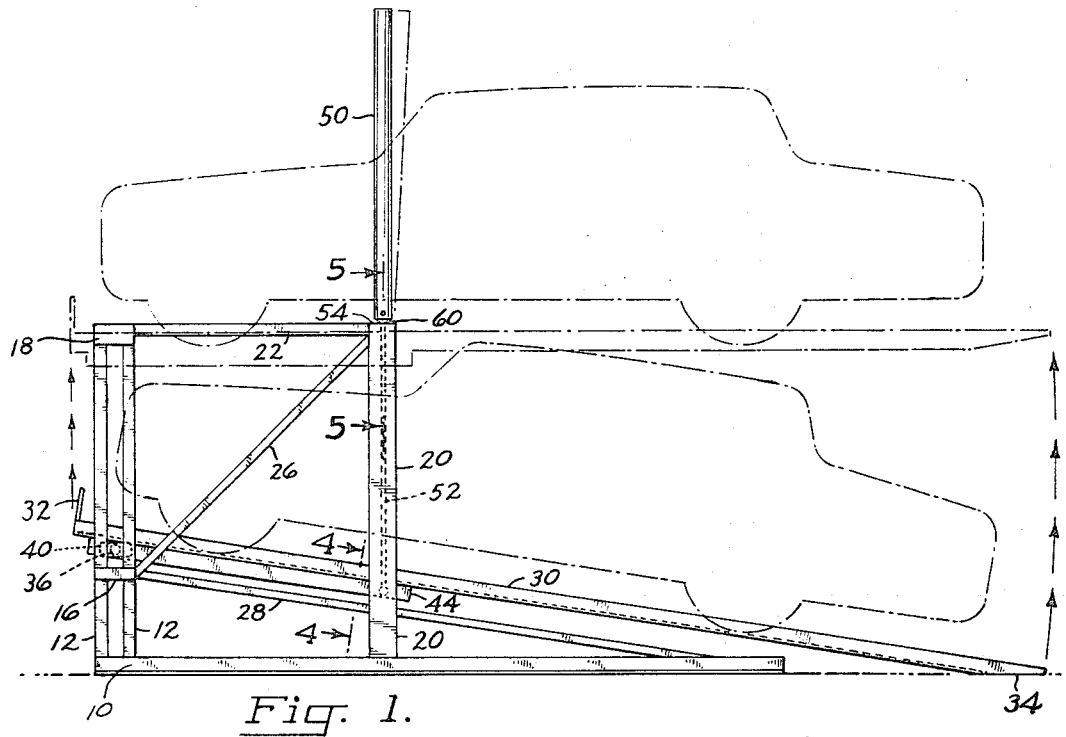
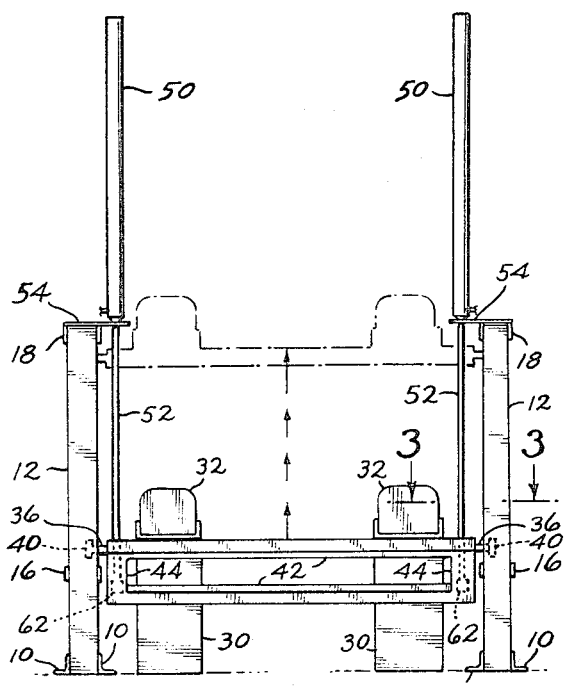
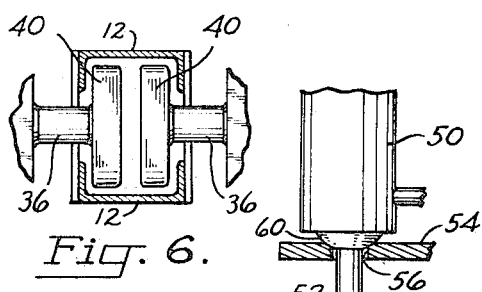
James O. Fisher, Sr.
Raymond O. Whitley
Charles E. Biddle, Sr.
INVENTORS
BY Eugene D. Farley
Atty.

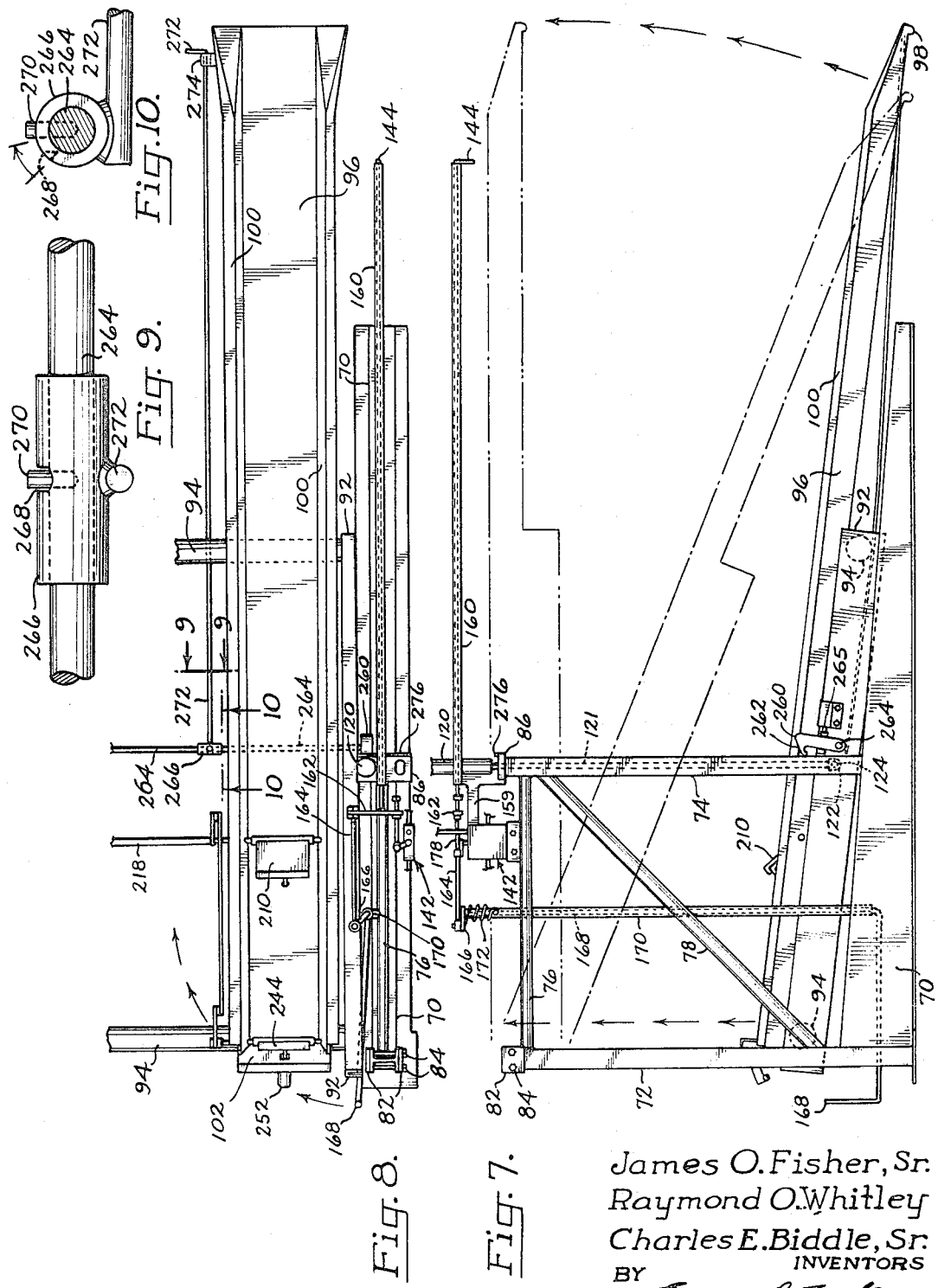

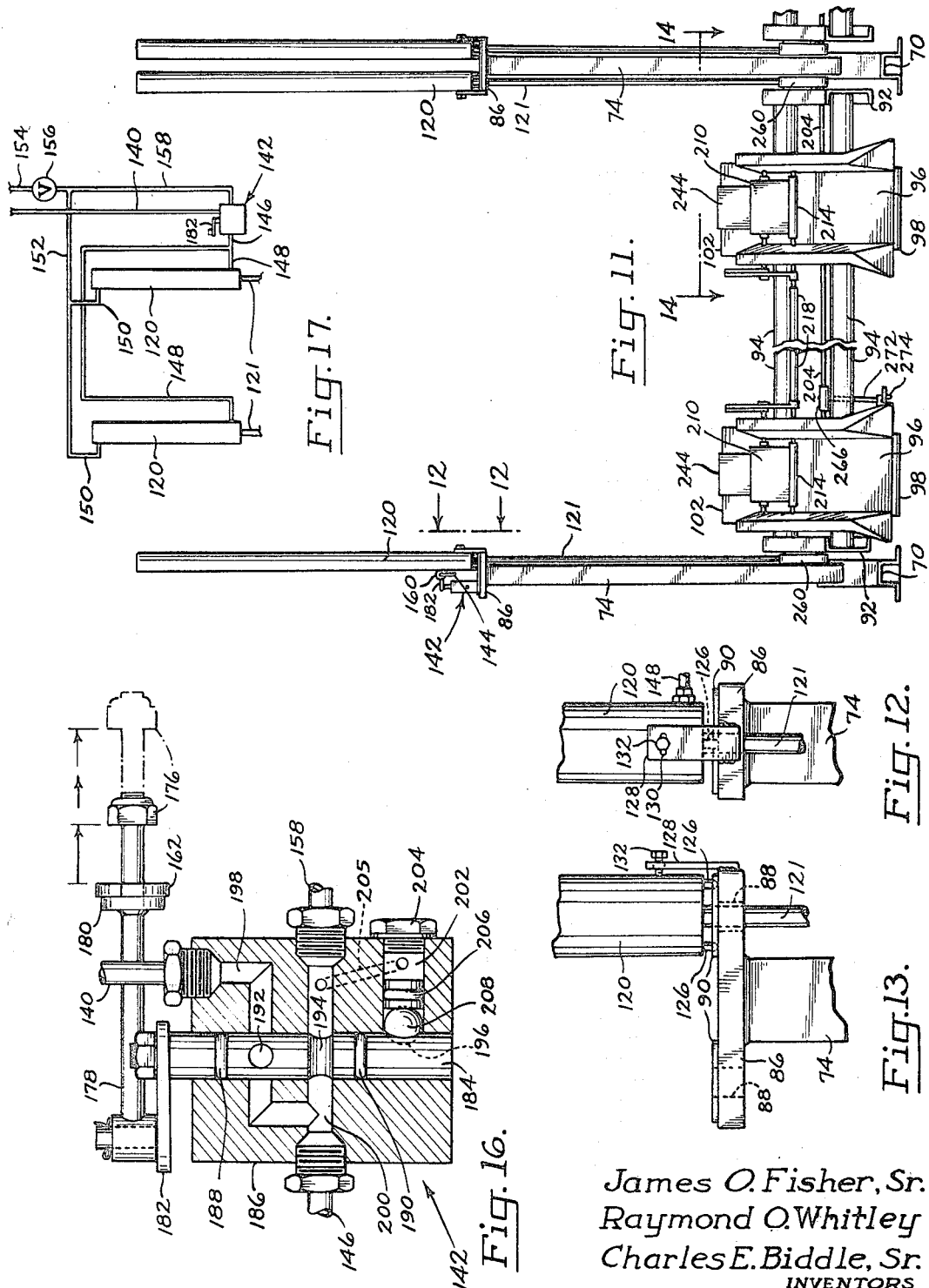

3,387,722
APPARATUS FOR PARKING VEHICLES IN
VERTICALLY ARRANGED PAIRS
James O. Fisher, Sr., Raymond O. Whitley, and Charles
E. Biddle, Sr., Portland, Oreg., assignors, by direct and
mesne assignments, to James O. Fisher, Jr., W. R.
Shadoff, Dan Harmon, Robert F. Mest, and George V.
Dugan
Continuation-in-part of application Ser. No. 553,766,
May 31, 1966. This application May 3, 1967, Ser.
No. 635,898
15 Claims. (Cl. 214—16.1)

ABSTRACT OF THE DISCLOSURE

Vehicle parking apparatus comprises a frame enclosing a platform support receiving a first vehicle. Vertical guide means are positioned at the front end of the frame and cooperating slide means on the front of the vehicle support. Reversible lift means are connected to the support intermediate its ends for elevating the support and the first vehicle to an elevation permitting driving a second vehicle beneath the elevated support.

---

This application is a continuation in part of the application of James O. Fisher et al., Ser. No. 553,766, filed May 31, 1966.

This invention relates to apparatus for parking automobiles and other vehicles in vertically arranged pairs.

In many high-ceilinged garages and other parking areas the opportunity is afforded of parking vehicles one above the other, thereby doubling the storage capacity of the garage. Various expedients have been devised heretofore for taking advantage of this opportunity, but all have involved the application of equipment so costly and complicated as to be economically unattractive.

It accordingly is the general object of the present invention to provide apparatus for parking vehicles in vertically arranged pairs, which apparatus is simple in construction, easy and safe to operate, and sufficiently low in cost to be economically attractive to the average garage and parking space proprietor.

In the drawings:

FIG. 1 is a view in side elevation of the herein described apparatus for parking vehicles in vertically arranged pairs, illustrating a vehicle in both its loading and stored position;

FIG. 2 is a view in front elevation of the apparatus of FIG. 1;

FIG. 3 is a detail sectional view taken along line 3—3 of FIG. 2;

Figure 14:
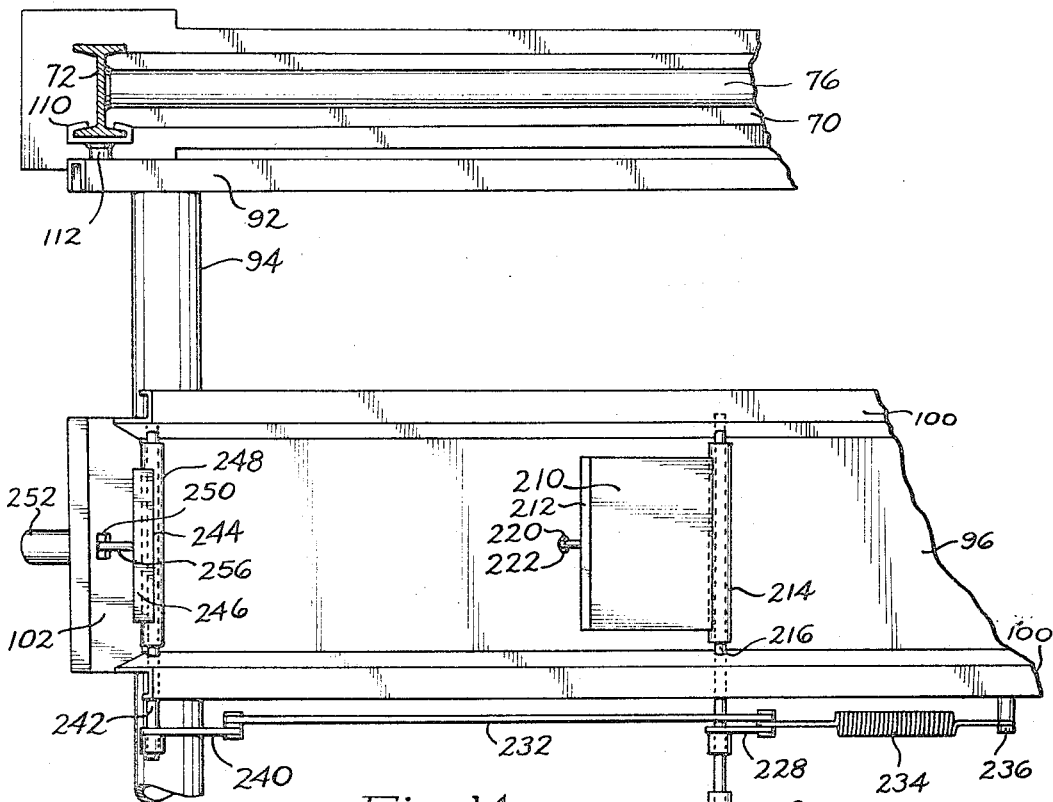
Figure 15:
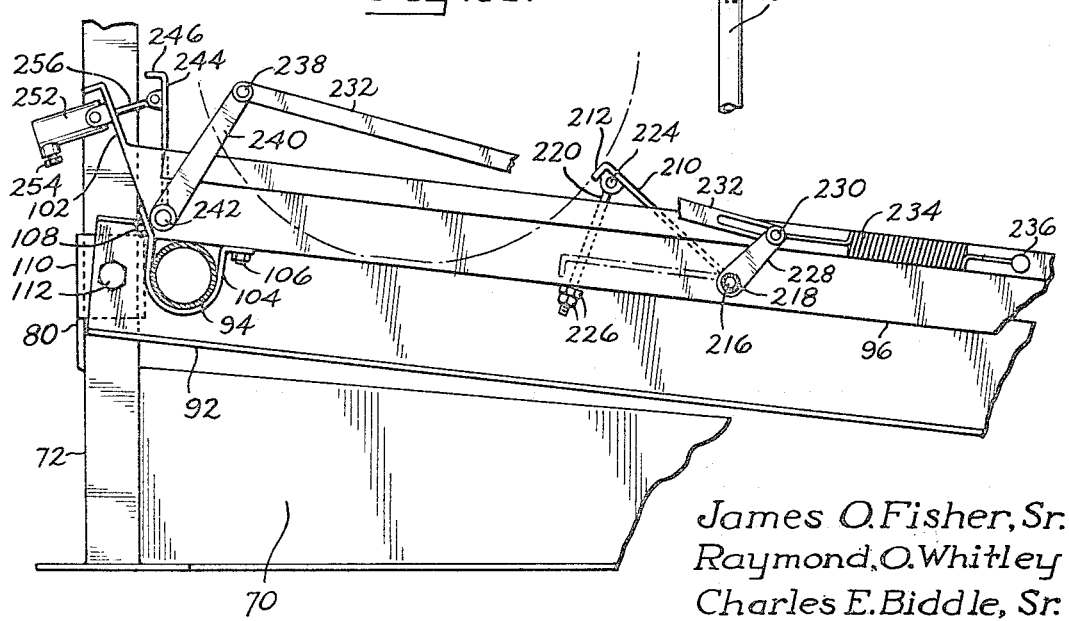

FIGS. 4 and 5 are detail sectional views taken respectively along lines 4—4 and 5—5 of FIG. 1;

FIG. 6 is a detail sectional view similar to FIG. 3, but indicating a frame construction for mounting two of the parking units in side by side arrangement;

FIG. 7 is a side elevation and FIG. 8 a fragmentary plan view of our apparatus in a second embodiment;

FIG. 9 is a detail fragmentary view and FIG. 10 a detail transverse section taken along lines 9—9 and 10—10, respectively, of FIG. 8;

FIG. 11 is a front elevation of the apparatus of FIGS. 7 and 8;

FIGS. 12 and 13 are detail fragmentary views in side and front elevation, respectively, FIG. 12 being taken along line 12—12 of FIG. 11;

FIGS. 14 and 15 are fragmentary views in plan and side elevation, respectively, illustrating chock means employed in the apparatus; and FIGS. 16 and 17 are views of the hydraulic circuit used in the apparatus, FIG. 16 being a sectional view of a novel valve included in the circuit.

Broadly stated, the vehicle parking apparatus of our invention comprises a ramp or other platform dimensioned to receive the vehicle. Vertical guide means are stationed at the front end of the platform. Slide means are mounted on the front of the platform and arranged for vertical reciprocation in the guide means.

Fluid-operated cylinders or other reversible elevating means are connected to the platform intermediate its ends for elevating the platform, and a first vehicle mounted thereon, to an elevation permitting driving a second vehicle beneath the platform. The elevating means then maintains the platform and the vehicle which it supports in the elevated position until such time as it is desired to lower the vehicle to its unloading position. The potential storage space present in a garage or parking structure thus is doubled.

Considering the foregoing in greater detail and with particular reference to the drawings:

The apparatus of FIGS. 1 to 6

The herein described vehicle parking apparatus is supported on a frame which may comprise two spaced pairs of two spaced angle irons 10, the angle iron pairs being arranged on the floor parallel to each other and spaced horizontally a sufficient distance to accommodate the vehicles to be parked and the component angle irons of each pair being spaced sufficiently from each other to brace the vertical components of the apparatus.

The first vertical components comprise two pairs of vertically positioned, spaced channel irons 12 arranged facing each other, as shown in FIG. 3. As will appear hereinafter, these pairs of channel irons serve as guideways. Each pair is provided with lower combination brace and stop plates 16 and upper combination brace and stop plates 18, spanning the gaps between the channel irons.

The second vertical components of the frame comprise posts 20, spaced inwardly from channel irons 12 a distance which bears a relation to the center of gravity of a vehicle to be parked on the apparatus, placing the center of gravity of the vehicle slightly behind the posts. This permits opening the vehicle doors. It also makes possible elevating the vehicle through a cantilever effect, as will appear hereinafter.

The vertical components of the frame are interconnected and braced by angle irons 10, upper horizontal structural members 22, upper diagonal members 26 and lower diagonal members 28.

The frame thus described supports the vertically movable platform on which the vehicle is supported and stored.

In the illustrated form of the invention, the platform comprises a pair of parallel ramp members 30, each channel-shaped in cross section and each provided at its forward end with a vehicle stop 32. As seen in FIG. 1, the rearward end is beveled at 34 so that the beveled surface rests flush against the floor when the ramp members are in their inclined, loading position.

Slide means are provided for mounting the forward ends of ramp members 30 slidably in guide members 12.

To this end, the forward end of each of the ramp members is provided with a laterally extending abutment bar 36, FIG. 3, to the outer end of which is fixed a slide block 40, dimensioned for sliding reception in the guideway formed by opposed channel members 12. If desired, the slide block and guideway may be sized relative to each other so that two slide blocks can work in a single guideway, FIG. 6. This permits arrangement of the parking units in a desirable consolidated, side by side, space saving pattern.

As the ramp member moves up and down, abutment bar 36 strikes against stop plate 16 in the down position and against stop plate 18 in the up position, thus determining the degree of elevation of the ramp member.

To facilitate the elevation of the platform members and to secure them in their spaced, parallel positions, they are mounted on a frame subassembly, the construction of which is seen in FIG. 2.

This sub-assembly includes a pair of spaced, transverse box beams or other suitable structural members 42 and a pair of linking, longitudinal box beams or similar structural members 44. The rearward ends of longitudinal beams 44 are formed with apertures 46 which afford means of connecting a power source to ramp members 30.

Although the ramp members may be reciprocated between lowered and elevated positions through the agency of power sources such as cable drives, rack drives, and various other means, it is preferred to accomplish this by means of a pair of elongated fluid-operated cylinders 50. These may be single-acting, hydraulic or air cylinders. They are provided with elongated piston rods 52.

To mount each cylinder in its operative position, on one side of the apparatus, coupled directly to the corresponding one of ramp members 30, there are fixed to the upper ends of posts 20 a pair of inwardly extending horizontal plates 54.

Each of plates 54 has transversely therethrough an opening 56 dimensioned to accommodate piston rod 52 of the cylinder, FIG. 5. A convexly arcuate bearing pad 60 is fixed to the lower end of cylinder 50 being thus interposed between the adjacent faces of the cylinder and plate 54.

Coupling means are provided for coupling the outer ends of piston rods 52 to the frame sub-assembly supporting ramp members 30. A pivotal coupling of simple, yet durable construction, is shown in FIG. 4.

The lower end of each of piston rods 52 mounts a transverse bearing 62. A pin 64 is pressed into aligned openings 66 in the side walls of box beam 44 and is journalled in the bearing, supporting the load.

As the ramp members are moved between the full and dotted line positions of FIG. 1, their necessary angular movement is accommodated by the pivotal connections thus provided. This angular movement is accompanied by a corresponding angular movement of cylinders 50, as indicated also in dotted outline in FIG. 1 (which, in turn, is accommodated by the action of arcuate bearing pads 60 interposed between the cylinder ends and the supporting structure).

It is to be noted further that arranging platform members 30 in ramp position through the use of stop plates 16 makes posible the utilization of cylinders 50 of relatively short stroke, thus reducing their cost.

*Operation of the apparatus of FIGS. 1 to 6*

A car is driven on platform members 30 in their lowered ramp position of FIG. 1. After the car is fully loaded, it is blocked appropriately to maintain its loaded position. The piston rods 52 of cylinder 50 are retracted. Since the piston rods are coupled to the platform members at a location determined by the location of posts 52, ahead of the center of gravity of the vehicle, the forward end of the platform elevates first.

The front end of the vehicle thus is lifted to the upper, dotted line position of FIG. 1, the extent of elevation being determined by abutment of abutment bars 36 against stop plates 18. Thereafter the rear end of the vehicle is cantilevered to the upper dotted line position of FIG. 1, with expenditure of a minimum of energy.

As the platform members and vehicle are lifted, the necessary angular adjustment of the lifting elements of the apparatus is made first, by the action of pivotal couplings including pivot pins 64 and second by adjustment of arcuate bearing pads 60 in their sockets.

Space now is afforded for driving a second vehicle below the elevated first vehicle, utilizing the available parking area to maximum advantage. The capacity of a restricted storage space thus is doubled.

*The apparatus of FIGS. 7 to 17*

The apparatus is supported on a stationary frame including pairs of laterally spaced, parallel, base members 70. As many pairs as are needed may be secured to the floor in lateral alignment. Each base member has oppositely flanged feet, and an upwardly and rearwardly inclined top surface.

Base members 70 mount forward and rearward vertical posts 72, 74.

Forward posts 72 comprise I-beams of substantial strength and of sufficient height to permit the desired vertical storage of two vehicles.

Rearward posts 74 comprise box beams positioned between the ends of base members 70 and having a height substantially equal to the height of I-beams 72.

Posts 72, 74 are braced by horizontal braces 76 and diagonal braces 78.

The lower intermediate portions of I-beams 72 mount stop plates 80. Their upper portions mount stop plates 82 interconnected by bolts 84.

The tops of box beams 74 mount transverse plates 86 which overhang the beams on both sides. The overhanging portions of the plates have transverse perforations 88 and mount pads 90, side by side.

The frame thus described supports the vertically reciprocable platform on which the upper vehicle is supported and stored.

As illustrated, the platform comprises a pair of substantial channel members 92 spaced from and parallel to each other. Members 92 are interconnected and braced by heavy tubes 94.

The channel members 92 and tubes 94 support a pair of spaced parallel tracks or ramp members 96 which receive the wheels of the vehicle to be stored.

The rearward ends of ramp members 96 are flared outwardly to receive the vehicle wheels and are provided with slides 98 which bear against and slide along the floor. The side walls of the ramp members are provided with flared flanges 100. The forward ends of the ramp members are closed with slanting stops 102.

The ramp members are secured to cross tubes 94 by means which permit the adjustment of the ramp members laterally to accommodate vehicles of various lateral wheel spacing. Such means comprise straps 104, FIG. 15, bolted to the underside of ramp members 96 and to the outside of stop plates 102. Lateral adjustment is made by releasing bolts 106, 108, shifting the ramp members to the desired spacing, and tightening the bolts.

The entire platform assembly is mounted for vertical reciprocation on the stationary frame described above in which it nests. The mounting means comprise C-shaped slides 110, FIG. 14, which engage the flanges of I-beams 72. The slides are connected to the outer faces of channel frame members 92 by pivot pins 112.

The platform assembly is raised and lowered by a suitable reciprocating drive which may comprise a pair of long, single-acting hydraulic cylinders 120, FIG. 11. The cylinders are mounted endwise on cross plates 86 supported by posts 74. Their piston rods 121 extend through openings 88 in the cross plates. The lower ends of the piston rods are provided with blocks 122 which mount pivot pins 124 by means of which the ends of the piston rods are connected to channel members 92.

Since cylinders 120 move angularly during operation of the apparatus, their lower ends engage pairs of aligned bearings 126 mounted on pads 90. Short bars 128 stabilize the cylinders. The lower ends of the bars are welded to the ends of plates 86. Their upper ends are provided with horizontal slots 130. These receive bolts 132 threaded into the cases of cylinders 120. Clearance thus is provided to accommodate the angular rocking movement of the cylinders.

The hydraulic circuit operating cylinders 120 is illustrated in FIG. 17.

Pump conduit 140 supplies hydraulic fluid under pressure to a specially designed valve 142, operated by a control rod 144. When the control rod is adjusted to the open position of the valve, fluid is passed through conduit 146 and branch conduits 148 to the working sides of the pistons contained in cylinders 120. As the pistons retract, elevating the platform, the fluid from behind the pistons is discharged through branch lines 150, connecting line 152, and return line 154 which communicates with the pump reservoir.

A constricting valve 156 is present in return line 154. It pressurizes the fluid contained in a line 158 which also communicates with valve 142.

Valve 142, FIGS. 16 and 17, functions to prevent inadvertent lowering of the upper vehicle when another vehicle is in position immediately below.

To this end a mounting bracket 159 is fixed between longitudinal frame member 76 and plate 86. The bracket mounts a long guide tube 160 which receives and guides rod 144 which operates valve 142. The inner end of rod 144 connects centrally to a cross piece 162. One end of the cross piece is connected through a link 164 to a crank 166. The crank operates an angular lever 168 housed and guided in a vertical guide 170. A coil spring 172 interconnects the guide and the crank.

The lower end of angular lever 168 swings in the arc indicated in FIG. 8, against the tension of spring 172. If there is a vehicle in the lower space, it will intercept the lever, arresting its motion. No actuation of valve 142 thereupon will occur.

However, if no vehicle is present and the lever completes its full swing, cross piece 162 engages a nut 176 adjustably threaded on the shank of valve-operating lever 178. The valve operating lever is fitted with a stop 180 which limits the advanced position of rod 144. Its forward end pivotally is connected to one end of a crank 182, the other end of which is fixed to an outwardly projecting end of valve core 184.

Core 184 rotatably is mounted in a valve block 186 and is sealed by means of O-rings 188, 190. It is cross bored with openings 192, 194 which are substantially at right angles to each other. It also is provided with a detent depression 196 at its lower end.

Valve block 186 has a first passageway 198 which registers with valve core opening 192 and a second passageway 200 which registers with valve core opening 194. One end of passageway 198 connects to conduit 140 leading to the pump. The other end of passageway 198 merges with passageway 200 adjacent the end of the latter which connects with conduit 146 leading to cylinders 120. The other end of passageway 200 connects with conduit 158 which returns fluid to the reservoir through constrictor valve 156.

Block 186 also is provided with a radial recess 202 and with a connecting passageway 205 which interconnects the recess and passageway 200.

The outer end of recess 202 is sealed with a plug 204. A piston 206 works in the recess and operates a ball check 208. The latter seats in detent opening 196 when pressure is applied behind the piston. Pressure thus is applied, locking the valve in its open position, when control rod 144 is moved by the operator to its extreme closed position.

To operate the valve, rod 144 is fully advanced to rotate valve core 184 until conduit 198 is open. Fluid under pressure is supplied through lines 140, conduit 198, and line 146 to the cylinders, retracting them and elevating the vehicle. Upon retracting rod 144 to its fully retracted position, which is possible if a second vehicle is not present in the lower station, valve core 184 is adjusted to its FIG. 16 position.

Fluid now flows under the pressure generated by the weight of the vehicle through conduit 146, conduit 200, and conduit 158 back to the reservoir. However, because of the inclusion of constrictor valve 156 in the return line, pressure is built up in connecting passageway 205 and recess 202. This advances piston 206, presses ball check 208 into detent 196 and locks the valve.

When the vehicle is fully lowered, the flow of fluid through return line 158 ceases. The pressure in recess 202 is relieved. Ball check 208 no longer is pressed into recess 196. The valve accordingly is ready for subsequent actuation when it is desired to elevate another vehicle.

Two more safeguards are present for insuring safe operation of the apparatus: one, automatic chock means for releasably securing the vehicle in its loaded position on ramp member 96; and the other, releasable latch means for latching the platform and ramp members in their elevated position.

The automatic chock means present in each of the ramp members, FIG. 14, comprises a chock plate 210 having a downwardly-angled bearing segment 212 adapted to bear against the rear surface of the front wheel tire. The rear end of the chock plate is rigid to a sleeve 214 which is fixed to a rock shaft 216.

Rock shaft 216 is journaled in the opposite side walls of ramp member 96. Its inner end is fastened to a connector 218 which connects it with a similar rock shaft in the companion ramp member.

Chock member 210 is designed to move angularly between the elevated solid line and depressed dotted line positions of FIG. 15. Its elevation is limited by suitable restraint means, such as limit rod 220 which penetrates an opening 222 of restricted size in the bottom of the ramp member.

The upper end of limit rod 220 pivotally is connected to the underside of chock plate 210 by means of a pivot pin 224. The lower end of the limit rod is threaded and mounts lock nuts 226, the adjustment of which determines the stroke of the limit rod.

Rock shaft 216 mounts a crank 228 which pivotally is connected through pin 230 to a connecting bar 232. A coil spring 234 interconnects pin 230 and a short post 236 mounted on the ramp member.

The forward end of link member 232 is connected through pivot pin 238 to a second crank 240. The latter in turn is fixed to a rock shaft 242, also journaled in the side walls of ramp member 96.

A chock-actuating plate 244 having an angularly bent upper margin 246 is mounted on rock shaft 242 by means of a fixed sleeve 248.

Chock-actuating plate 244 is mounted immediately adjacent end plate 102 of the ramp member. Plate 102 has a central opening 250 and mounts externally a dashpot or bleeding air cylinder 252. The latter is provided with an adjustable air release valve 254 and a piston rod 256. The latter extends through opening 250. Its forward end pivotally is connected to plate 244.

The construction of the latch means used to latch the platform and ramp members in their elevated positions is illustrated in FIGS. 7 and 8.

Each of channel frame members 92 mounts centrally on its outer side face a hook-shaped latch 260. The latch is formed with an upper cam surface 262. It pivotally is mounted by pivot shaft 264 to channel member 92 in such a position that the hook body lies immediately adjacent and substantially parallel to post 74. The end of the hook is pressed into sliding engagement with the adjacent surface of the post by means of a spring-pressed piston rod 265.

Shaft 264 extends across the unit and is journaled in channel members 92. It operates an identical latch on the far side of the unit.

Centrally of shaft 264, between ramp members 96, there is located a sleeve 266. The sleeve is fixed to the shaft and is formed with a central radial slot 268. A pin 270 is fixed in shaft 264 and extends radially outwardly through the slot. A control lever 272 is mounted with its forward end welded to the underside of sleeve 266 and its rearward end received in a downwardly-oriented friction clip 274 located conveniently to the operator at the rearward end of one of ramp members 96.

The upper end of each of posts 74 is provided with a transverse latch bar 276 positioned for engagement by latch 260 when the ramp members are elevated.

*Operation of the apparatus of FIGS. 7–17*

The operation of the apparatus of FIGS. 7–17 is generally similar to that of the apparatus of FIGS. 1–6, previously described.

However, as the first vehicle is driven on ramp members 96, it depresses chock plates 210 against the tension of coil spring 234. As soon as the front wheels have passed over the chock plates, the latter are returned to their full line position of FIG. 15 by the action of the spring.

With the vehicle thus in position and restrained by the chock plates from rolling backwardly, the operator pulls central rod 144 rearwardly. This retracts cross link 162, FIG. 8, until it engages adjustable nut 176. Continued rearward actuation of the rod turns crank 182, FIG. 16, and rotates valve spool 184 to the position in which conduit 140 leading from the pump connects with conduit 146 leading to lift cylinders 120.

The cylinders are retracted, lifting the ramp members to the intermediate and final dotted line positions of FIG. 7. During this motion the cam surfaces 262 of latches 260 slide along the adjacent surfaces of posts 74 and guide the latch hooks over detent bars 276 on plates 86. This is done against the pressure of spring-pressed piston units 265 so that the latches are snapped over the detents and lock the ramp members in their elevated position.

A second vehicle then safely may be driven in the space below the first.

When it is desired to unload the unit, the second vehicle first is backed out. Rod 144 is retracted to actuate cylinders 120 to their lifting positions. This raises the platform until hooks 260 clear latch bars 276.

Operating lever 272 then is removed from friction clip 274. Upon moving the lever angularly downwardly it first merely rotates sleeve 266. However, when the angular distance indicated in FIG. 10 has been traversed, pin 270 engages the side wall of slot 268 and shaft 264 is rotated to release the latches. It is to be noted, however, that if the second vehicle still were in position beneath the first, it would not be possible to depress lever 272 sufficiently to achieve this result since the lower vehicle would be in the way. This affords an important safeguard against premature release of latches 260.

After latches 260 have been released, control lever 144 is pushed inwardly. The first effect of this action is to move cross piece 162 forwardly and move the linkages actuating the angular movement of bar 168 which sweeps across the arrowed pathway of FIG. 8. This movement is not possible if a second vehicle is still beneath the first, affording a second safeguard against premature lowering of the ramp members.

Continued advancement of rod 144 moves cross piece 162 until it engages stop 180 on link member 178. Crank 182 then is moved counterclockwise as viewed in FIG. 16, turning valve core 184 until conduit 146 from the cylinders connects with conduit 158 to the reservoir. However, since the flow of fluid to the reservoir is restricted by valve 156, recess 202 is pressurized, piston 206 advanced, and ball check 208 seated in detent 196. This locks the valve in position so that the operator can attend to other duties during the lowering operation. When the ramp members reach their fully lowered position, the pressure condition present in recess 202 disappears so that valve spool 184 again can be adjusted to its lift position.

When the ramp members are in their fully lowered position, the vehicle still cannot be backed off because chock plates 210 are in their working positions. To render them inoperative, the operator drives the car against chock-actuating plates 244. This advances the latter plates against end plates 102 of the ramp members and, through the connecting linkages including link member 232, lowers the chock plates against the tension of coil spring 234.

Upon reversing the vehicle, the chock plates do not spring back immediately to their working positions, because of the restraining effect of dashpot 252. The car thus may be backed down off the ramp members during the time interval that the chock plates slowly are returning to their elevated positions.

Thus there is provided apparatus for parking vehicles in vertically arranged pairs which apparatus is simple in construction, easy and safe to operate and sufficiently low in cost to be attractive economically.

Having thus described our invention in illustrative embodiments, we claim:

1. Vehicle parking apparatus comprising a base frame, a platform mounted on said frame and dimensioned to receive a vehicle, vertical guide means mounted on the base frame at the front end of the platform, slide means mounted on the front end of the platform and being substantially freely movable for vertical reciprocation in said guide means, reversible elevating means connected to the platform intermediate its ends, and forwardly of the center of gravity of the vehicle and platform when said vehicle is located on said platform, for elevating the platform and a first vehicle thereon to an elevation so that a second vehicle can be parked beneath the elevated platform, an upper and lower fixed stop means defining the upper and lower limits of travel of the front end of said platform, said lower stop means being located a spaced distance above the base frame, whereby the platform on being operated by the elevating means is caused to swing about the upper stop means to assume a horizontal position and is caused to abut against the lower stop means to determine the degree of inclination of the platform at ground level.

2. The vehicle parking apparatus of claim 1 wherein the vertical guide means comprises two pairs of spaced channel members and wherein the slide means comprises a pair of slide blocks each dimensioned for reciprocation in the space between the channel members of one pair and each connected to the platform by a horizontal abutment bar, and each pair of channel members being interconnected by a pair of vertically spaced stops positioned for contact by the abutment bar in the loading and elevated positions of the platform respectively.

3. The vehicle parking apparatus of claim 1 wherein the reversible elevating means comprise a pair of vertically positioned fluid operated cylinders positioned one on each side of the platform, above the same, and having elongated piston rods pivotally coupled one to each side of the platform.

4. The vehicle parking apparatus of claim 3 including a frame having a pair of apertured, transverse members, the fluid operated cylinders being freely supported with their respective piston rods each extending through the aperture in one of the transverse members, and convexly arcuate bearing pads interposed between the cylinder ends and the transverse members for permitting angular movement of the cylinders with reciprocation of the piston rods between advanced and retracted position determining respectively the loading and elevated positions of the platform.

5. The vehicle parking apparatus of claim 3 wherein the platform is recessed and wherein the pivotal means for interconnecting the end of each piston rod and the platform comprises bearing means mounted on the end of each piston rod and a transverse pin supported by the side walls of the recess and journalled in the bearing means.

6. The apparatus of claim 1 wherein the platform comprises a horizontal frame including forward and rearward cross members and trough shaped ramp members and including releasable clamp means clamping the ramp members to the cross frame members to permit the lateral adjustment of the ramp members.

7. The apparatus of claim 1 including chock means on the platform for engaging the wheels of the vehicle mounted therein.

8. The apparatus of claim 1 wherein the platform includes a pair of ramp members positioned to receive the vehicle and including chock means in the ramp members, the chock means comprising a chock plate, a pivotal shaft mounting the plate for angular movement between raised and lowered positions, resilient means connected to the shaft for normally urging the plate to its raised position, and plate-actuating means connected to the plate for depressing it to its lowerd position when it is desired to remove the vehicle from the ramp members.

9. The apparatus of claim 8 wherein the plate-actuating means comprises an actuating plate positioned in the ramp member forwardly of the chock plate, a pivotal shaft mounting the actuating plate for movement between raised and lowered positions, link means linking the two plates for movement in unison with each other, and restraining means connected to the actuating plate for restraining its return movement from the lowered to the raised position.

10. The apparatus of claim 1 including latch means positioned relative to the platform releasably to latch it in the elevated position.

11. The apparatus of claim 1 including latch means positioned relative to the platform releasably to latch it in the elevated position, the latch means comprising a vertical guide post, a spring-pressed hook pivotally mounted on the platform adjacent the guide post, the hook having a cam surface adapted to slide along the surface of the guide post as the platform is elevated, detent means in the upper part of the guide post positioned for engagement by the latch means, and latch release means connected to the latch means for releasing the latch from the detent means.

12. The apparatus of claim 11 wherein the latch release means comprises: a rock shaft mounting the latch hook, a radially slotted sleeve rotatable on the rock shaft, a radial pin mounted on the rock shaft and extending through the slot, and an operating lever fastened to the sleeve, the operating lever being arranged to sweep a collision arc with a second vehicle present in the space beneath the elevated platform, before actuation of the rock shaft by the pin.

13. The apparatus of claim 1 wherein the reversible elevating means comprises: a pair of vertically positioned, fluid operated cylinders positioned one on each side of the platform, above the same, and having elongated piston rods pivotally coupled one to each side of the platform; an hydraulic circuit including the cylinders and containing valve means for adjusting the cylinders between platform-raising and platform-lowering positions, and lever means connected to the valve means for operating the same.

14. The apparatus of claim 13 wherein the lever means is arranged to traverse a collision path with a second vehicle present in the space beneath the elevated platform, before actuation of the valve means to its platform-lowering position.

15. The apparatus of claim 13 wherein the valve means is adjustable between positions of platform-raising and platform-lowering and including valve control means operative to maintain the valve in its position of platform-lowering until the platform has been lowered to the ground.

References Cited
UNITED STATES PATENTS

| | | | |
|---|---|---|---|
| 1,521,990 | 1/1925 | Beynon | 214—1 XR |
| 1,525,447 | 2/1925 | Hose | 214—1 XR |
| 2,538,517 | 1/1951 | Hayden | 187—9 |
| 2,545,953 | 3/1951 | Hall | 214—1 |

GERALD M. FORLENZA, *Primary Examiner.*

RAYMOND B. JOHNSON, *Assistant Examiner.*